United States Patent [19]

Emsens

[11] Patent Number: 4,837,895

[45] Date of Patent: Jun. 13, 1989

[54] MACHINE FOR THE AUTOMATIC PRODUCTION OF KEBABS OF MEAT AND/OR VEGETABLES THREADED ONTO SKEWERS

[75] Inventor: Michel Emsens, Aurec, France

[73] Assignee: Emsens Antoine S.A.R.L., France

[21] Appl. No.: 936,080

[22] Filed: Dec. 28, 1986

[30] Foreign Application Priority Data

Nov. 27, 1985 [FR] France .................. 85 17975
Oct. 31, 1986 [FR] France .................. 86 15643

[51] Int. Cl.$^4$ .............................................. A22C 7/00
[52] U.S. Cl. ................................................ 17/1 S
[58] Field of Search ..................................... 17/1 S

[56] References Cited

U.S. PATENT DOCUMENTS 3,405,422 10/1968 Sico et al. .................. 17/1 S
4,352,242 10/1982 Plet ............................. 17/1 S
4,604,771 8/1986 Dollé ........................... 17/1 S

FOREIGN PATENT DOCUMENTS

0098451 1/1984 European Pat. Off. ......... 17/1 S

Primary Examiner—Willie G. Abercrombie
Attorney, Agent, or Firm—Eric P. Schellin

[57] ABSTRACT

The invention refers notably to the technical sector involving the forming or treatment of food products. The machine has a combination, suitably mounted on a frame (S), of a sliding support plate (1) arranged axially at the base of the container (7) and mounted with guided vertical displacement capability, being coupled to a control mechanism, with the said plate (1) having a removable chassis (4) arranged to permit removable vertical positioning of a number of skewers (6) with a view to pressing them into the various layers during action on the above-mentioned control mechanism; one or more cutting devices being connected to a control mechanism with horizontal outward and return motion, while being mounted with a guided sliding motion in relation to the frame (S) and perpendicular to at least one of the faces of the container (7) with a view to cutting the layers of meat and/or vegetables, with the skewering and cutting devices being controlled synchronously from a single control point. The invention is notably used for the fully automatic production of kebabs of meat and/or vegetables.

2 Claims, 7 Drawing Sheets

MACHINE FOR THE AUTOMATIC PRODUCTION OF KEBABS OF MEAT AND/OR VEGETABLES THREADED ONTO SKEWERS

The object of the invention relates to the sector involving the shaping or treatment of food products.

One is familiar with machines to produce kebabs mechanically; these are equipped with threading and automatic or semi-automatic cutting facilities. To date, these machines have used wooden skewers which are fragile and easily breakable, especially when they encounter hard layers of meat. Therefore, problems are experienced with skewering. The latter has to be done manually with certain precautions, making it lengthy and thus restricting output considerably.

In the case of automatic skewering, it is necessary to provide special facilities to support the skewers while preventing their breakage as far as possible at the time of insertion and as the operation progresses.

Faced with this problem, the object of the invention became to produce a machine shaped and adapted for automatic production of kebabs, skewering and cutting, in a reliable, efficient and simple manner, with the possibility of having the meat and/or vegetable container supplied to and removed from the machine automatically.

The skewers used can be made of wood or metal, of the type perfectly well-known for the preparation of kebabs.

With this objective, the invention is remarkable in that the skewering device is arranged axially above the container while being shaped and controlled vertically in order, on the one hand, to permit automatic and simultaneous skewering of all the metal skewers which are positioned vertically in locations in the upper face of the container, so that the said skewers rest on the layers of meat and/or vegetables and, on the outer, to ensure the pressurising of the said upper face of the container after inserting the skewers and during the cutting operation.

In accordance with another characteristic, under the base of the container, mounted coaxially and sliding freely, there is a support plate which takes, either directly or detachably, a number of pre-piercing rods arranged opposite and matching holes which open out and are formed in the bottom of the said container holding the skewers, with the skewering device and the said support plate for the pre-piercing rods being connected to shaped and adapted control facilities in order, in an initial stage, to permit the insertion of the pre-piercing rods into the different layers of meat and then, during a subsequent stage, to permit the withdrawal of these rods and the simultaneous insertion of the skewers as the pre-piercing rods are being withdrawn.

The invention is explained in more detail below with the aid of drawings showing two embodiments:

in FIG. 2,

FIG. 4 is a plan view showing the positioning of the container,

FIG. 5 is a front view corresponding to FIG. 4,

FIG. 6 is a front view showing the skewering,

FIG. 7 is a view similar to FIG. 6 showing the first section,

FIG. 8 is a plan view showing the second section at an angle of 90°,

FIG. 9 is a plan view showing the connection of the container with a view to its use, FIG. 10 is a profile corresponding to FIG. 9, FIG. 11 is a plan view showing the removal of the container.

In order to make the objective of the invention more concrete, it will now be described in a non-restrictive manner using the figures contained in the drawings.

In known manner, the machine contains a combination, suitably installed within a frame (B), of an automatic skewering device and an automatic cutting device. The various layers of meat and/or vegetables are superposed in a basket or container (1) shaped to allow the movement of the cutting mechanisms, as indicated in the description which follows. This basket (1) is arranged in a detachable manner in a support plate (2) which is located on part of the frame (B).

The upper part of the basket (1) holds a guide (1a), the thickness of which has been designed to permit vertical, orderly positioning of a number of metal skewers (3) resting on the layer or layers of meat and/or vegetables arranged inside the said basket (1). For example, the guide (1a) is in the form of a lid of suitable thickness with a number of drilled vertical through holes (1a1). This guide (1a) is removable and acts as a cover centered on the vertical walls (1b) of the basket.

The skewering device is positioned above the basket (1) and axially in relation to the latter. In the embodiment illustrated in FIGS. 1 to 12, the device consists essentially of a support plate (4) connected to a control mechanism (5) to be moved vertically in a manner parallel with the cover of the guide (1a) holding the skewers (3).

In the example illustrated, the control mechanism (5) is a cylinder, the barrel (5a) of which is integral with the upper part (6a) of a supporting yoke (6) mounted inside the frame on either side of and concentric with the basket (1). The support plate (4) integral with the rod (5b) of the cylinder, can be equipped with guide columns (FIG. 1) mounted to slide freely in the appropriate sections in the upper face (6c) of the yoke (6).

Figure 1:
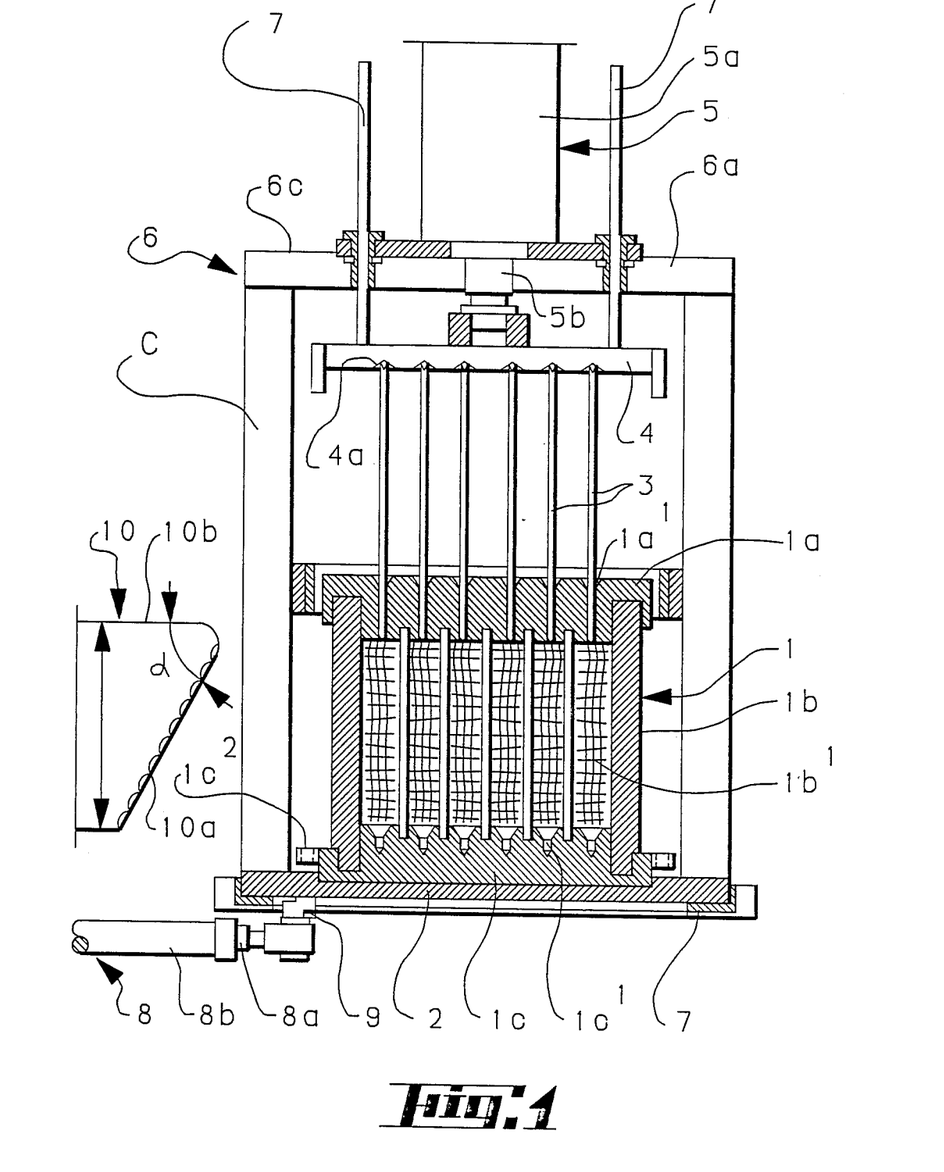
FIG. 1 is a longitudinal sectional view of the machine.
Figures 2, 3:
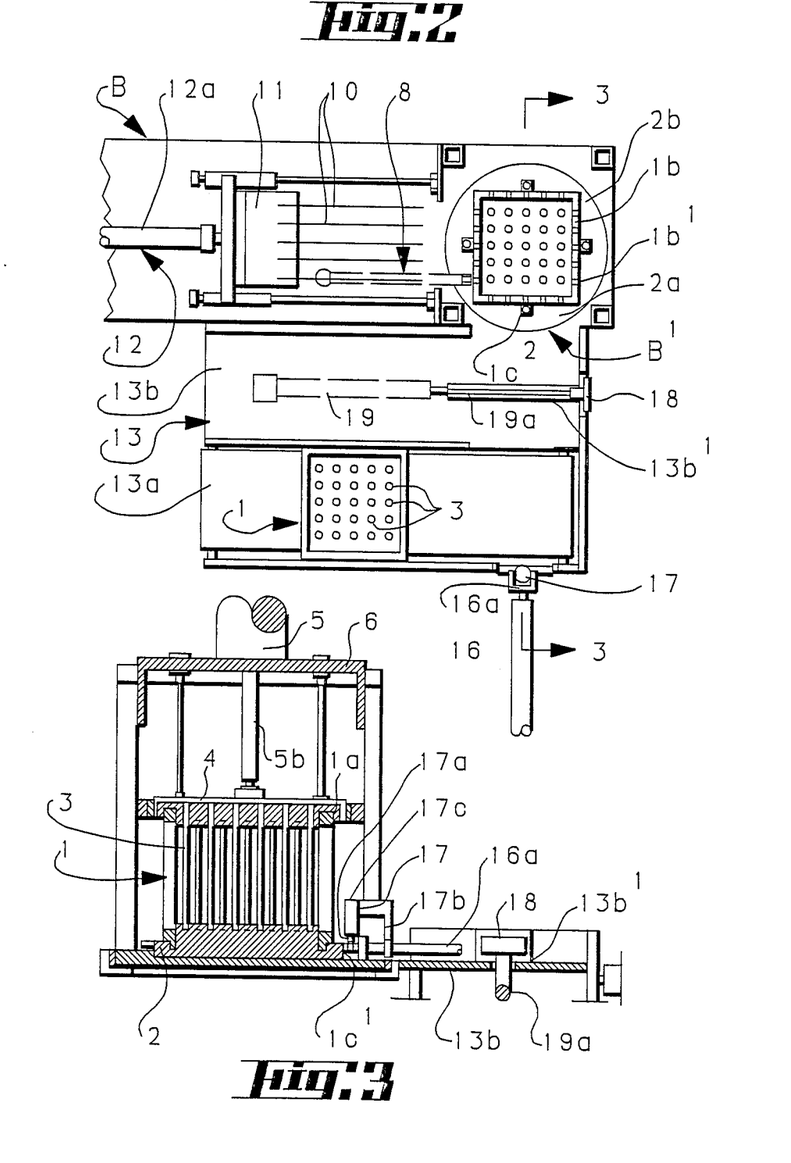
FIG. 2 is a plan view.
FIG. 3 is a cross-sectional view along line 3.3.

It is quite obvious that, with the rod (5b) of the cylinder (5) in the retracted position, the support plate (4) is retracted vertically above the skewers (3) positioned in the holes (1a1) in the guide cover (1a) (FIG. 1). Therefore, one conceives that, by acting on the cylinder (5), the plate (4), under the effect of the linear extension of the rod (5b), rests on the free end of the skewer assembly (3) and gradually presses them into the various layers of meat and/or vegetables as far as the stop position on the upper face of the guide cover corresponding to the complete insertion of these skewers (3). The bottom (1c) of the basket has a number of blind holes (1c1) matching the holes (1a1) for positioning the ends of the skewers.

The plate (4) remains under pressure and resting on the cover (1a), thus firmly holding the layers of meat and/or vegetables, a factor which is important during the cutting operation. For this purpose, in a preferred but not strictly limitative manner, the support plate (4) has its cross-section shaped for centering on the external cross-section of the cover. Likewise, in a preferred manner, the underside of the plate (4) has a number of hollow impressions (4a), the quantity of which matches that of the skewers (3). These impressions are designed to work together with the head of the skewers with a view to improving their positioning during skewering, under the effect of the pressure applied by the plate (4).

The plate (2) holding the basket (1) is mounted so that it rotates in a friction ring (7) integral with the frame, while being indexed angularly in rotation through a circular displacement of 90°. For example, the plate (2) is connected to a cylinder (8) whose rod (8a) is arranged to be connected via a pivot pin (9) to part of the said plate (2), with the barrel (8b) of this cylinder being freely hinged onto part of the frame (FIG. 1).

As a function of the control or pitch of the cylinder (8), the plate (2) and, therefore, the basket (1) are capable of occupying two angular positions offset 90°. It is emphasized that the basket (1) is centered on the plate (2), while being easily removable. For example, the base (1c) of the basket can be engaged with a guided sliding motion in either of two grooves (2a) and (2b) arranged at a 90° angle and shaped to act as a stop while the said basket (1) is travelling in order to position it axially in relation to the skewering device.

In the embodiment in FIGS. 12 to 16, the skewering device essentially consists of an assembly of two superposed support plates (21 and 22) connected to control mechanisms to be moved vertically in a manner parallel with the cover. As indicated, the cover (1a) has its thickness designed to permit vertical, orderly positioning of a number of skewers (20). The vertical holes (1a1) holding the skewers (20) are chamfered at each end. The cover (1a) is centered in the container (1) and rests on the walls. The control mechanisms consist of two vertical cylinders (23) and (24), the barrels (23a) and (24a) of which are integral with part of the frame (B) of the machine, while the rods (23b) and (24b) are connected to the plate (21).

The plate (21) is also integral with two guide columns (25) and (26) mounted to slide freely in rings (27) located on the upper part of the frame. The cylinders (23) and (24) and columns (25) and (26) respectively are arranged along the diagonals of the plate (21).

Overlapping its underside, the upper plate (21) has a number of thrust fingers (28), the number and arrangement of which match the holes (1a1) in the cover (1a) with the skewers 820). These fingers (28) slide freely in conjunction with vertical holes (22a) made in the thickness of the lower plate (22). The end of the holes (22a) which opens out is amply chamfered in order to position the skewers.

The plate (22) is held parallel with and at a distance from the upper plate (21) by means of coupling rods (29) and connected by these to a flexible return mechanism (30). The coupling rods (29) are freely engaged in the thickness of the plate (21) in such a way that the two plates can be subjected to a relative approach movement in opposition to the flexible mechanism (30).

The length of the fingers (28) is determined so that, with the two plates (21) and (22) touching, the fingers overlap the bottom plate (22) by a certain length.

It is recalled that the plate (2) holding the container (1) is mounted to rotate in an appropriate part of the frame, being indexed angularly by this in rotation through a circular displacement of 90°. The upper part of the container (1) and the cover (1a), where appropriate, works with a fixed support and centering base plate (31) integral with the frame (B).

In its center section, this base plate (31) has a horseshoe-shaped notch (3a) in which a circular raised impression (1a2) formed as an overlap on the cover (1a) is positioned and centered. After positioning the container (1) in the rotary plate (2), the base plate (31) rests on the cover, with the said container being able to rotate in relation to the said base plate.

In accordance with another characteristic, under the plate (2) and coaxial with the container (1), a support plate (32) is mounted to slide freely and has a number of pre-piercing rods (33). The rods (33) are arranged opposite and matching holes (1c2) which open out and are formed in the thickness of the bottom (1c) of the container (1). Quite obviously, the holes (1c2) are themselves arranged according to the same coordinates as the holes (1a2) in the cover (1a) holding the skewers. Likewise, the plate (2) with the container (1) has a coaxial opening (2a) to permit contact between the bottom of the said container and the pre-piercing assembly.

The support plate (32) is mounted to slide freely along the guide columns (34) integral with the frame (B). This plate is connected to a cylinder (35) for vertical displacement, in both directions, in the direction of the container (1) positioned in the plate (2) and the centering base plate (31). The cylinder is connected coaxially by its rod (35a) to the support plate (32).

In the embodiment illustrated, the pre-piercing rods (33) are fixed in a removable chassis (36) of dovetail shape and engaged to slide freely in a rotary base plate (37) mounted in the support plate (32). The base plate (37) is indexed in rotation to match the rotary plate (2) with the container (1).

In a significant manner, the cylinder (35) and the cylinders (23) and (24) are linked to a control system designed to permit retraction of the rods (23a) and (24a) and, consequently, lowering of the assembly of plates (21) and (22) as the rod (35a) of the cylinder (35) is returned to its initial retracted position.

Therefore, as the pre-piercing rods (33) are withdrawn from the layers of meat, the skewers (20) are inserted simultaneously.

The cutting device is advantageously of the type that comprises a set of knives (10), the number of which corresponds to the number of slots (1b1) which each of the side faces of the basket (1) has in a vertical direction.

The rear part of the knives (10) is integral with a coupling block (11) which is connected to the rod (12a) of a double-acting cylinder (12) with a view to imparting a horizontal outward and return motion to the knife carrier block assembly. The cutting section (10a) of the blade of the knives (12) is bevelled, and the height of this blade corresponds to at least the distance between the upper (1a) and lower (1b) guides of the skewering container (1). The length of the blades is a function of the dimensions of the container (1). The cutting edge (10a) of each of the blades is bevelled so that the longest horizontal side is located at the top or bottom.

It is therefore designed so that, when the cylinder (12) is operated, the set of knives (10) gradually penetrates into the different layers of meat and/or vegetables with a view to cutting them in a single operation.

Taking into account the simplification of the skewering device, irrespective of its design, as is shown in FIGS. 2-4 and FIGS. 8-11, it is possible to automate the positioning and removal of the machine baskets, as well as their discharge. To do this, at the level of the supporting plate (2) with the basket (1), the frame of the machine is extended at the side by a horizontal work surface (13) with two parallel longitudinal channels (13a) and (13b) arranged respectively to supply the baskets and to remove them.

The channel (13a) is, for example, connected to a conveyor belt and has two parallel rails (14) and (15) to guide the basket. Axially in relation to an opening (B1) in the frame (B) for the insertion of the basket (1) on the support plate (2), the work surface (13) is equipped with a cylinder (16), the rod (16a) of which is arranged to push the said basket in the direction of the said opening (B1) to position it on the plate (2). The cylinder (16) is of the double acting type in order that retraction of the basket from the plate (2) may also take place in conjunction with another cylinder (17).

The barrel (17c) of this cylinder (17) is arranged vertically in a plane perpendicular to the plane of the cylinder (16) and is made integral, via a yoke (17b) for example, with the rod (16a) of the said cylinder (16). Via its rod (17a), this cylinder (17) is intended to work with an appropriate part of the base (1c) of the basket with a view to its temporary connection. For this purpose, the base (1c) of the basket can have, overlapping the central section of each ot its faces, base plates (1c3), drilled through for the insertion of the rod (17a) of the cylinder (17). Therefore, one conceives that, when the cylinder (16) is actuated in order to retract its rod (16a), the cylinder (17) is moved simultaneously and, therefore, by means of its rod (17a) engaged in the hole in one of the base plates (1c), it drives the basket (1) out of the frame (B) in order to align it axially with the discharge channel (13b).

The channel (13b) has, at the end, an axial slot (13b1) arranged at right angles to the opening (B1) in the frame. This slot permits the overlap of a lateral support plate (18) whose base (18a) is connected to the rod (19a) of a cylinder (19) fixed below the channel (13b). This plate (18) is shaped to work in conjunction with the edge of the base plate (1c) of the basket with a view to its removal under the influence of the movement of the rod (19c).

It is advisable that the operation of the machine should now be analysed, it being quite obvious that the cylinder assembly is linked to any suitable control facility while being connected to various position detectors in order to produce the skewering and cutting cycle.

For ease of understanding, a voluntary distinction is made between, on the one hand, the operation relating to the skewering device in FIGS. 1 to 11 and, on the other, the operation of the skewering device in FIGS. 12 to 16.

Operation in accordance with FIGS. 1 to 11

A basket, filled with various layers of meat and/or vegetables is placed manually in the channel (13a), with the metal skewers (3) being positioned vertically in the holes (1a1) in the guide cover (1a), and resting on the said layers, the conveyor belt brings the basket to the end of the channel (13a) opposite the cylinder (16).

Figure 4:
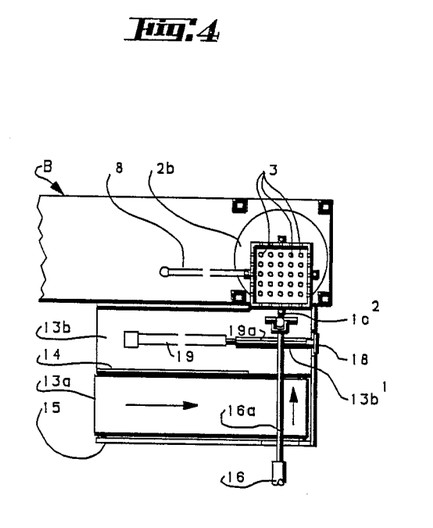
FIGS. 4 to 11 are views of a purely diagrammatical nature illustrating the main operating stages.
Figure 5:
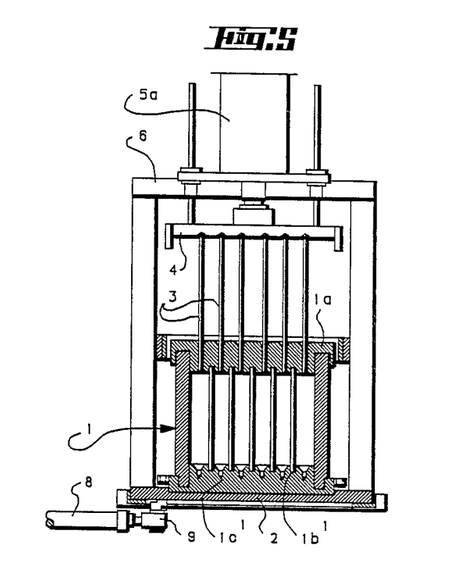

The cylinder (16) is operated, its rod (16a) pushes the basket in the direction of the opening (B1) in the frame (B), with a view to positioning it in one of the slots in the support plate (2) (FIGS. 4 and 5). At this moment, the rod of cylinder (16) can be partially retracted.

Figure 6:
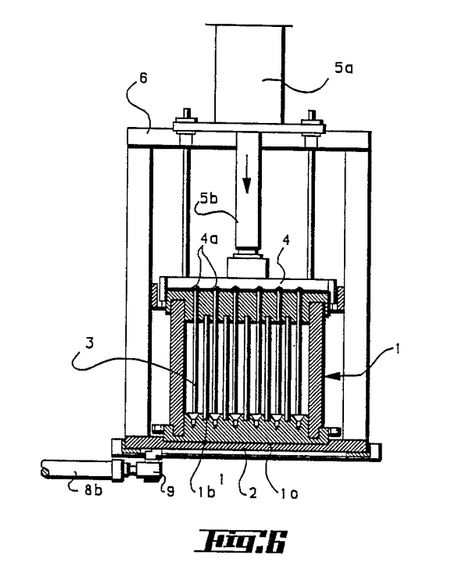

The cylinder (5) is actuated to lower the support plate (4) with a view to the simultaneous insertion of all the skewers (3) into the various layers of meat and/or vegetables. The plate (4) remains under pressure on the cover (1a) of the basket (FIG. 6).

Figure 7:
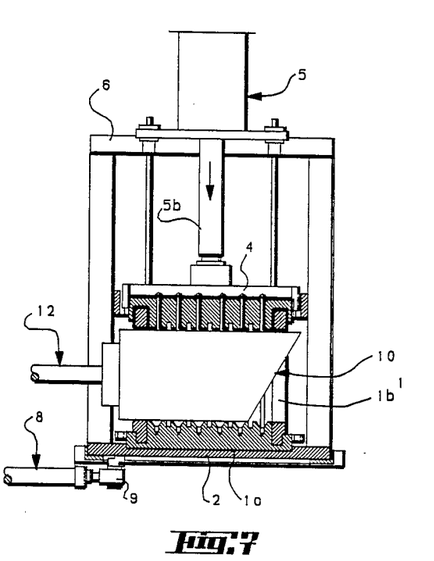
Figure 8:
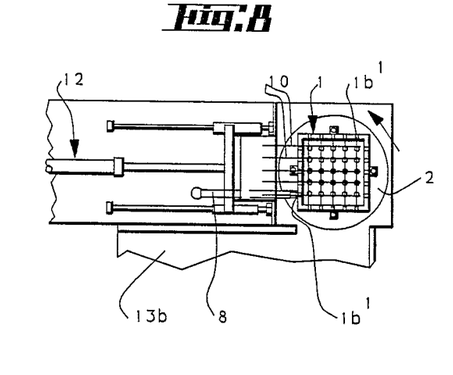

The cutting device is then loaded. The cylinder (12) moves the knives (10) which make an initial cut into all of the layers of meat and/or vegetables (FIG. 7). The knives are then released from the basket to permit its rotation through 90° by means of the cylinder (8); the contact cylinder (5) is partially released. It is then possible to make the second cut by means of the knives (10) which are again moved by the cylinder (12), with the cylinder (5) previously having positioned the plate (4) in contact with the basket. This cut is therefore made 90° from the first (FIG. 8).

Figure 9:
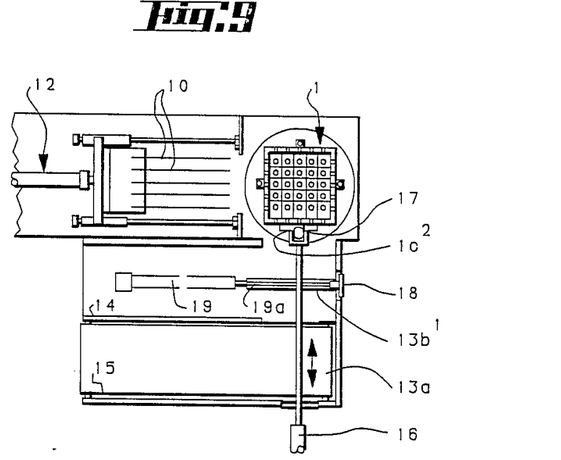

With the contact plate vertically retracted by the cylinder (5), it is appropriate to withdraw the basket from the machine, with the various layers of meat and-/or vegetables being suitably skewered and cut. For this purpose, the cylinder (16) is actuated to bring the cylinder (17) perpendicular with the base plates (1c) overlapping the base of the basket, so that the rod (17a) of the said cylinder (17) can be engaged in the corresponding holes of the base plate (1c1) (FIG. 9).

Figure 10:
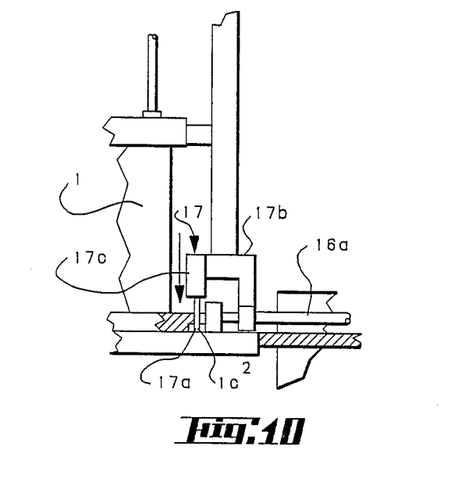
Figure 11:
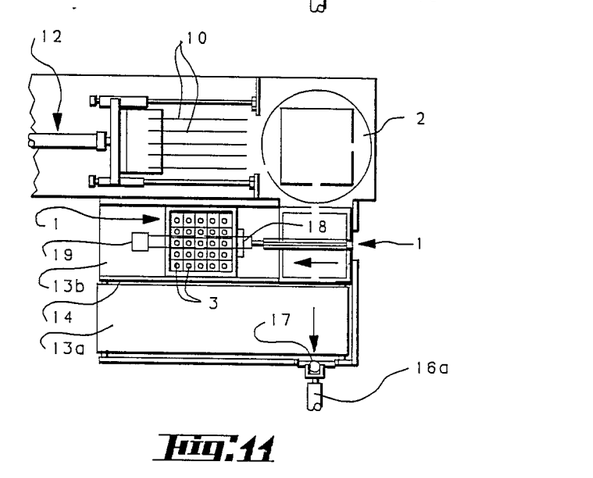

The rod of the cylinder (16) is then loaded in the reserve direction to move the basket (1) with a view to its extraction, until it is positioned along the center line of the discharge channel (13b) (FIG. 10).

The rod (17a) of the cylinder is vertically retracted to disconnect the basket, with the rod (16a) of the cylinder (16) being returned to the rest position.

With the basket (1) positioned along the center line of the channel (13b), the cylinder (19) is actuated to move the lateral contact plate (18) which works with the base of the basket with a view to its simultaneous movement for its removal. The cylinder (19) is then returned to its position and another cycle can then commence.

In an alternative embodiment, provision is made for the guide cover (1a) to rotate. In addition, talking into account the use of metal skewers (3), notably of the type with a special sectional profile, it is possible, with an identical overall basket size, to increase the number of skewers which, in compression, occupy a volume less than that of a skewer with a round, solid cross-section.

Operation in accordance with FIGS. 12 to 16

After first filling the container (1) with the various layers of meat and/or vegetables, the skewers (20) are inserted manually or automatically into the vertical guiding and positioning holes (1a1) in the cover (1). It should be noted that the skewers (20) have their flat end, at the opposite end to the pointed end, where there is one, in contact with the outermost layer of meat.

The container is then inserted into the centering and positioning facilities on the frame, i.e. the rotary plate (2) and the contact lid (31). The cover (1a) of the container (1) holding the skewers is then firmly held in contact with the container by the lid.

The container (1) can be inserted into the machine manually or else, as indicated previously, automatically.

Figure 12:
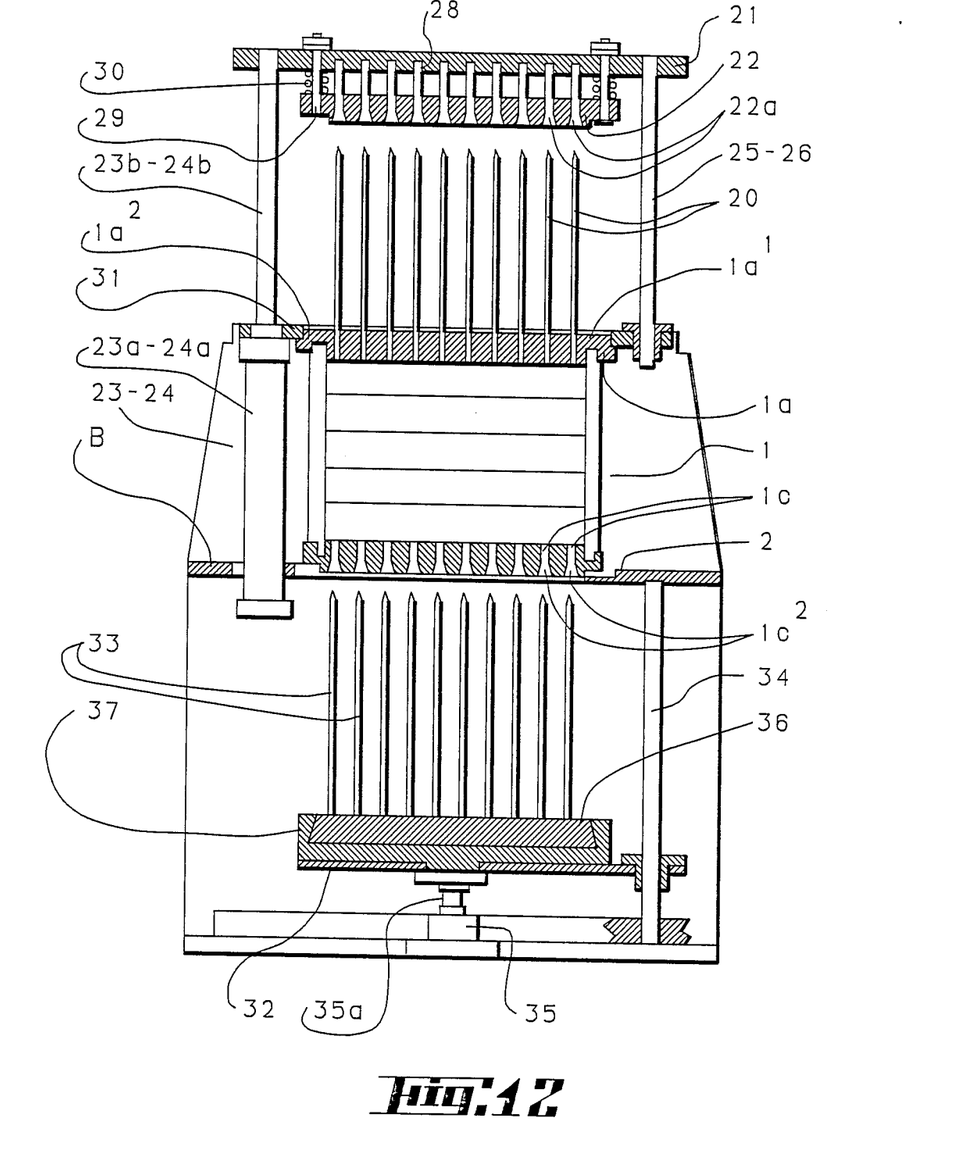
FIG. 12 is a sectional view of the machine.

At this stage, the rods (23b) and (24b) of the cylinders (23) and (24) are extended to keep the set of contact plates (21)-(22) in the raised position above the skewers positioned in the cover (1a) of the container (1) (FIG. 12).

Conversely, the rod (35a) of the cylinder (35) is retracted to keep the pre-piercing rods (33) under the bottom (1c) of the container in the lowered position. The skewers (20) and the pre-piercing rods (33) are arranged coaxially and in alignment with holes (1a1) and (1c2) respectively in the cover (1a) and the bottom (1c) of the container (1).

Figure 13:
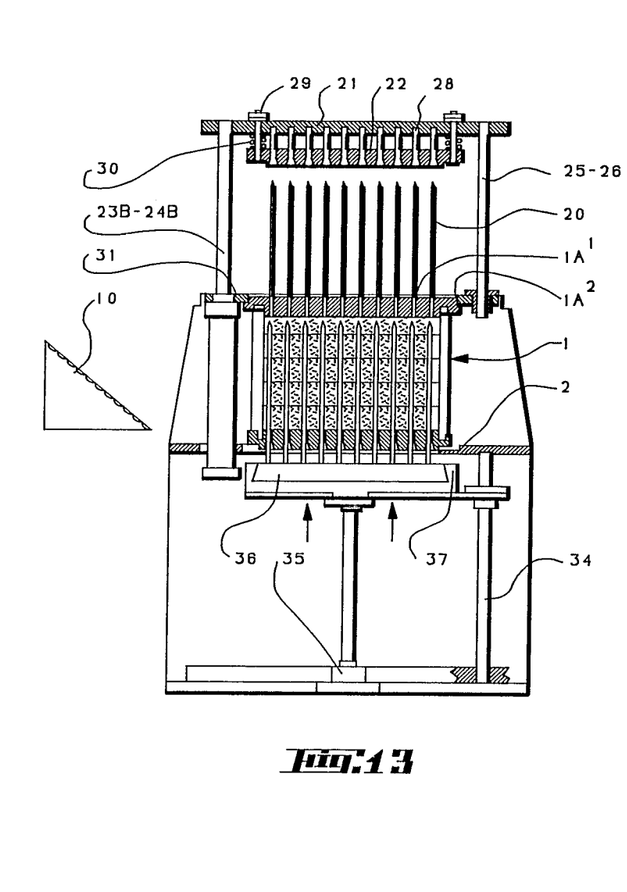
FIGS. 13, 14 and 15 illustrate the main phases of the skewering operation. To improve the clarity of the drawings, a single skewer and a single pre-piercing rod are illustrated.

The cylinder (35) is then actuated, with the effect that the the support plate assembly (32) is moved vertically in the direction of the container, causing the gradual insertion of the various pre-piercing rods (33) into the layers of meat and/or vegetables. The rods (33) are engaged via the holes (1c2) in the bottom of the container and are held in the partially engaged position in the bottom end of the holes (1a1), which opens out, in the cover in order to make contact with the corresponding skewers (20) (FIG. 13).

The cutting device is then loaded. The knives (10) are moved in order to make an initial cut into all of the layers of meat and/or vegetables between the pre-piercing rods (33). The knives are then released from the container (1) to permit its rotation through 90° under the influence of the circulcar movement of the plate (2). At the same time, the plate (37) with the pre-piercing rods is driven round, taking into account its freely rotating mounting.

The knives (10) are again moved in order to make the second cut 90° from the first. It is recalled that, in a preferred manner, the cutting edge (10a) of each of the blades is bevelled so that the longest side is arranged at the bottom.

Figure 14:
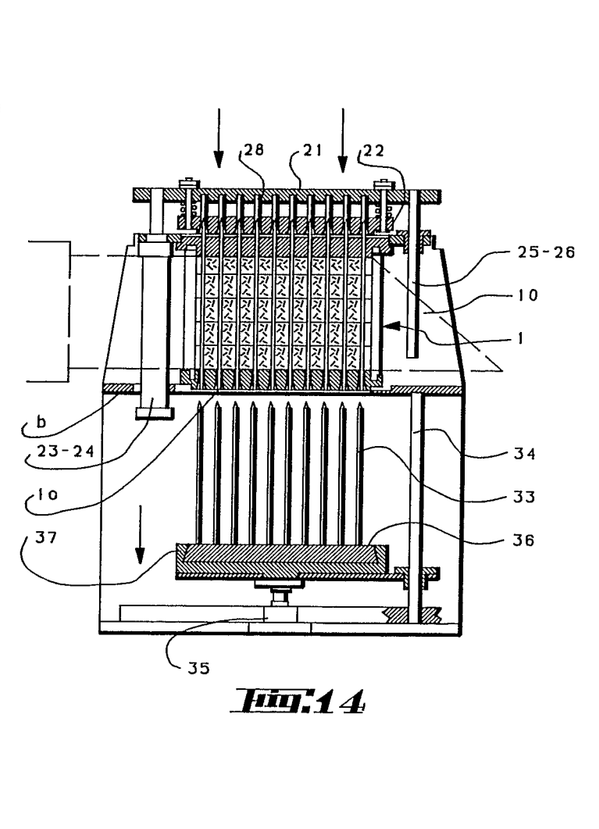

Before or after withdrawing the knives (10), the cylinder (35) is driven in the opposite direction to the previous one to make it possible to lower the support plate (32) with a view to withdrawing the pre-piercing rods (33). While the cylinder (35) is being controlled, cylinders (23) and (24) are put into a free release position in order to permit lowering under gravity of the set of support plates (21)-(22) whose thrust fingers (28) rest on the skewers (20), to cause the insertion of the said skewers (20) as the pre-piercing rods (33) are being withdrawn. It can therefore be conceived that the skewers (20) are in constant contact with the pre-piercing rods (33) and can therefore easily be pressed into the layers of meat and/or vegetables, while taking temporary advantage of the through holes made by the said rods (FIG. 14).

Figure 15:
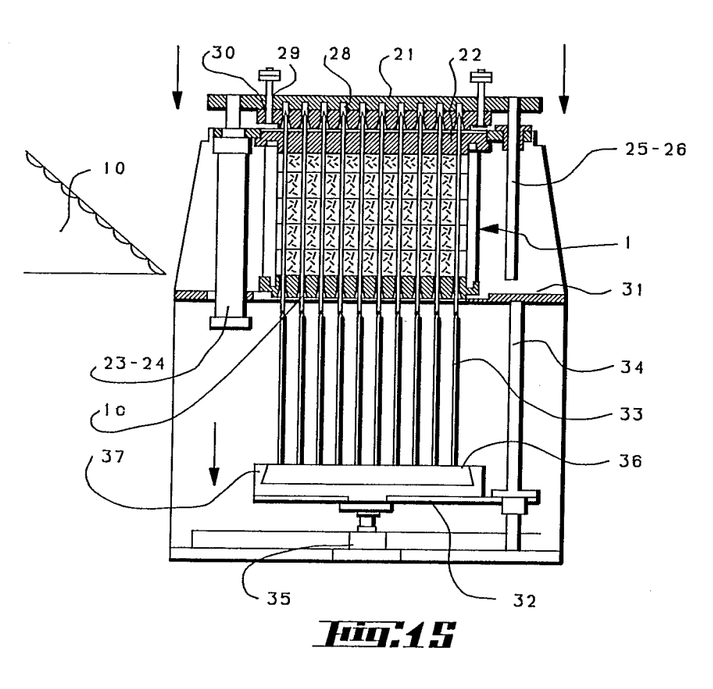
Figure 16:
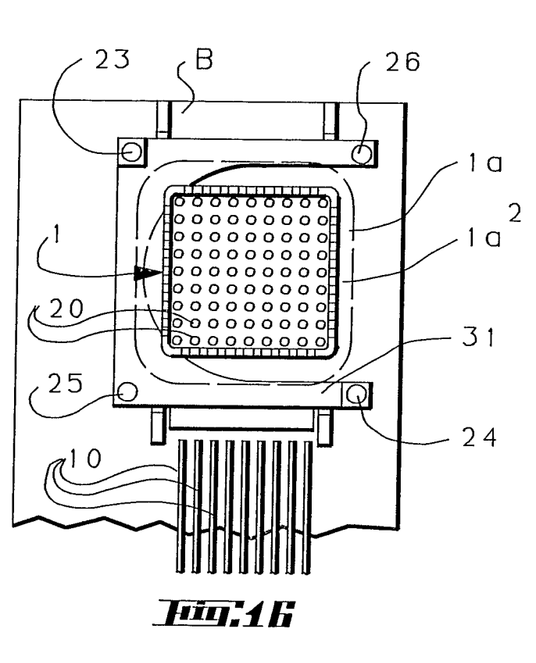
FIG. 16 is a plan view of FIG. 15.

When the lower plate (22) comes into contact with the cover (1a), with the pre-piercing assembly retracted, the upper plate (21) is lowered by the rods (23a) and (24a) of the cylinders (23) and (24), causing the thrust fingers (28) to overlap the lower plate (22) which consequently finish pressing in the skewers (FIG. 15).

The rods of the cylinders (23) and (24) are then extended again to return the plates (21) and (22) to the raised position; these plates are automatically moved away under the release force of the return springs (30).

It suffices to withdraw the container (1) manually or automatically with the various layers of meat and/or vegetables suitably skewered and cut.

It should be noted that, in order to lower the contact plates (21) (22), the control cylinders (23) and (24) can be either put into free release as indicated, or controlled positively to permit retraction of their respective rods (23a) and (24a).

The skewering device described and illustrated in FIGS. 1 to 11 is used more particularly for rods made of metal or another material whose nature and/or cross-section give it considerable rigidity. On the other hand, the skewering device in FIGS. 12 to 16 is used for the various types of wooden skewer which are currently used and are relatively fragile.

I claim:

1. Apparatus for automatic production of kebabs of food, said apparatus including: a cutting and skewering container for receiving multiple layers of said food; cutting means for slicing said layers of food; control means connected to said cutting means for reciprocating said cutting means in a generally horizontal plane and for moving said cutting means generally vertically for slicing all of said layers of food in said container during one continuous vertical pass therethrough; said apparatus having cover plate means (4, 21) disposed above said container and means on said plate means for loosely receiving an end of each of a plurality of skewers vertically disposable within vertical openings in said cover plate axially above said container and supportable upon said layers of food; and means for moving said plurality of skewers downwardly for simultaneously forcing all of said skewers through all of said multiple layers of food during a single downward movement; wherein said apparatus includes a rotary plate (2), means for slidably connecting said container to said rotary plate, and means for rotating said rotary plate and said container through a 90 angle; and wherein said apparatus includes a plurality of thrust fingers (28) carried by plate means (21) and is in alignment with said vertical openings in said cover plate.

2. Apparatus as defined in claim 1 further including a guide plate (22) having a plurality of holes (22a) formed therein alignment with an receiving said thrust fingers, and spring means (30) disposed between and flexibly connecting said plate means and said guide plate.

* * * * *